United States Patent
Kawasaki et al.

(10) Patent No.: US 10,177,611 B2
(45) Date of Patent: Jan. 8, 2019

(54) STATOR CORE, STATOR, AND ROTATING ELECTRICAL MACHINE

(71) Applicant: Mitsubishi Electric Corporation, Chiyoda-ku, Tokyo (JP)

(72) Inventors: Sachiko Kawasaki, Tokyo (JP); Atsushi Sakaue, Tokyo (JP); Hisashi Namura, Tokyo (JP); Shinichi Ito, Tokyo (JP); Satoru Akutsu, Tokyo (JP); Masatsugu Nakano, Tokyo (JP); Toyoaki Udo, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 328 days.

(21) Appl. No.: 14/906,874

(22) PCT Filed: Feb. 26, 2014

(86) PCT No.: PCT/JP2014/054677
§ 371 (c)(1),
(2) Date: Jan. 21, 2016

(87) PCT Pub. No.: WO2015/011939
PCT Pub. Date: Jan. 29, 2015

(65) Prior Publication Data
US 2016/0181876 A1 Jun. 23, 2016

(30) Foreign Application Priority Data
Jul. 24, 2013 (JP) .................................. 2013-153316

(51) Int. Cl.
*H02K 1/00* (2006.01)
*H02K 1/16* (2006.01)
(Continued)

(52) U.S. Cl.
CPC ............. *H02K 1/16* (2013.01); *B62D 5/0409* (2013.01); *B62D 5/0463* (2013.01); *H02K 3/12* (2013.01); *H02K 3/28* (2013.01); *H02K 15/024* (2013.01)

(58) Field of Classification Search
CPC .......... H02K 1/16; H02K 3/12; H02K 15/026; H02K 1/14; H02K 1/06
(Continued)

(56) References Cited

U.S. PATENT DOCUMENTS 3,827,141 A     8/1974   Hallerback
6,140,728 A *   10/2000   Tomita ................. B62D 5/0403
                                                                          310/156.12
(Continued)

FOREIGN PATENT DOCUMENTS

CN       102754330 A     10/2012
DE       10121043 A1     10/2002
(Continued)

OTHER PUBLICATIONS

International Search Report (PCT/ISA/210) dated May 20, 2014, by the Japanese Patent Office as the International Searching Authority for International Application No. PCT/JP2014/054677.
(Continued)

*Primary Examiner* — Thanh Lam
(74) *Attorney, Agent, or Firm* — Buchanan Ingersoll & Rooney PC

(57) ABSTRACT

A stator core for a rotating electrical machine includes an annular yoke portion; a tooth group fitted to an inner side of the yoke portion and formed such that both ends in a circumferential direction on an inner circumferential side of adjacent teeth are integrally connected with each other by a thin connection portion; and a slot for accommodating a stator winding. The yoke portion has grooves at regular
(Continued)

intervals in an inner circumferential surface thereof and extending in an axial direction of the stator, the grooves each having a V shape such that a cross section thereof perpendicular to the axial direction opens toward an inner side of the stator core. Each tooth has, at an outer-circumferential-side end thereof, a fitting portion whose cross section perpendicular to the axial direction is formed in a wedge shape so as to allow the tooth to be fitted along the corresponding groove.

6 Claims, 17 Drawing Sheets

(51) Int. Cl.
  *H02K 15/02* (2006.01)
  *B62D 5/04* (2006.01)
  *H02K 3/12* (2006.01)
  *H02K 3/28* (2006.01)
(58) Field of Classification Search
  USPC .................................. 310/216.001–216.137
  See application file for complete search history.

(56) References Cited

U.S. PATENT DOCUMENTS

| | | | | |
|---|---|---|---|---|
| 8,505,674 B2* | 8/2013 | Neubauer | ............ | B62D 5/0403 180/443 |
| 2005/0242677 A1* | 11/2005 | Akutsu | ................... | H02K 3/28 310/179 |
| 2006/0138883 A1* | 6/2006 | Yagai | .................... | H02K 3/522 310/71 |
| 2009/0236919 A1* | 9/2009 | Poulin | .................... | H02K 1/02 310/44 |
| 2011/0101816 A1* | 5/2011 | Kondou | ................... | H02K 1/16 310/216.069 |
| 2012/0007463 A1* | 1/2012 | Taniguchi | ............. | H02K 1/165 310/216.051 |
| 2012/0286710 A1 | 11/2012 | Gyori | | |

FOREIGN PATENT DOCUMENTS

| | | | |
|---|---|---|---|
| JP | 07-163076 | A | 6/1995 |
| JP | 10-271716 | A | 10/1998 |
| JP | 2000-341889 | A | 12/2000 |
| JP | 2001-218439 | A | 8/2001 |
| JP | 2006-060976 | A | 3/2006 |

OTHER PUBLICATIONS

Written Opinion (PCT/ISA/237) dated May 20, 2014, by the Japanese Patent Office as the International Searching Authority for International Application No. PCT/JP2014/054677.

Extended European Search Report dated Apr. 10, 2017, issued by the European Patent Office in corresponding European Application No. 14829700.5. (9 pages).

Office Action (First Notice of Reason for Rejection) dated Jun. 2, 2017, by the State Intellectual Property Office of the People's Republic of China in corresponding Chinese Patent Application No. 201480041518.8, and an English Translation of the Office Action. (23 pages).

* cited by examiner (a)　　　　　　　(b)

Fig. 11
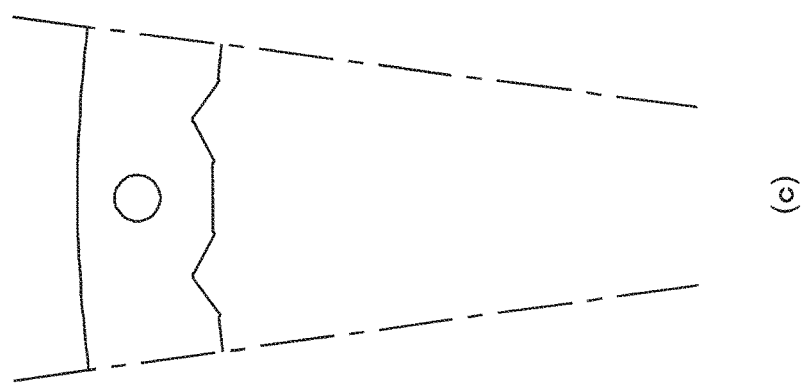
(c)
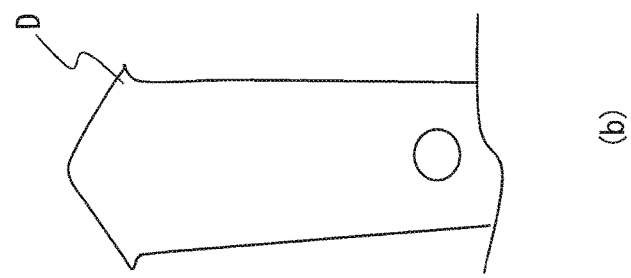
(b)
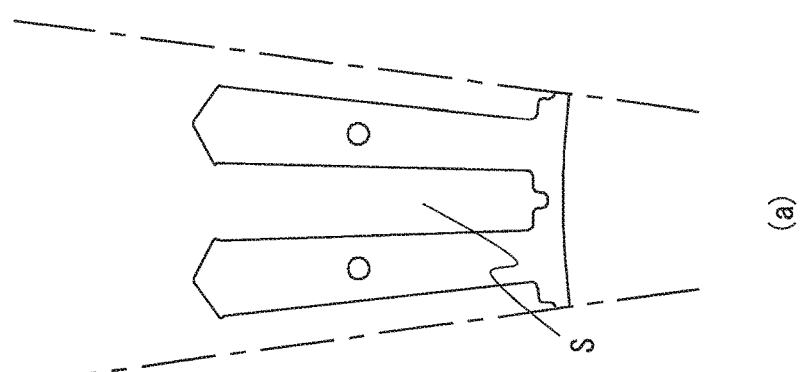
(a)

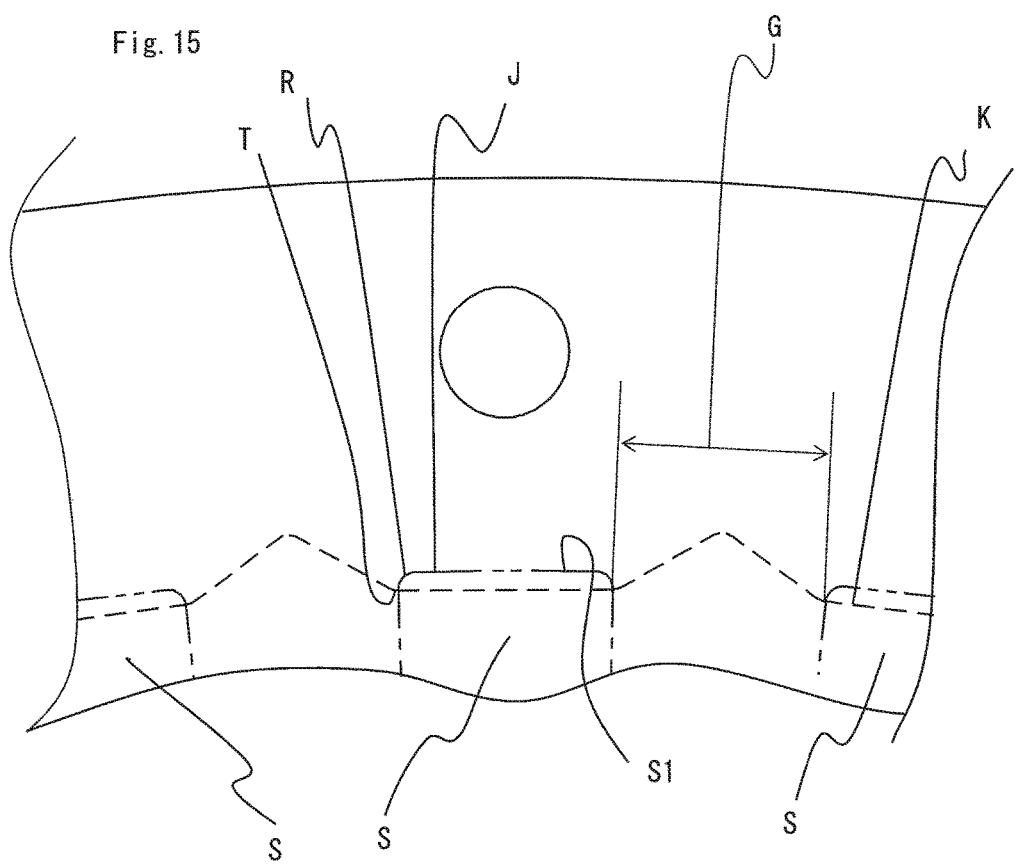

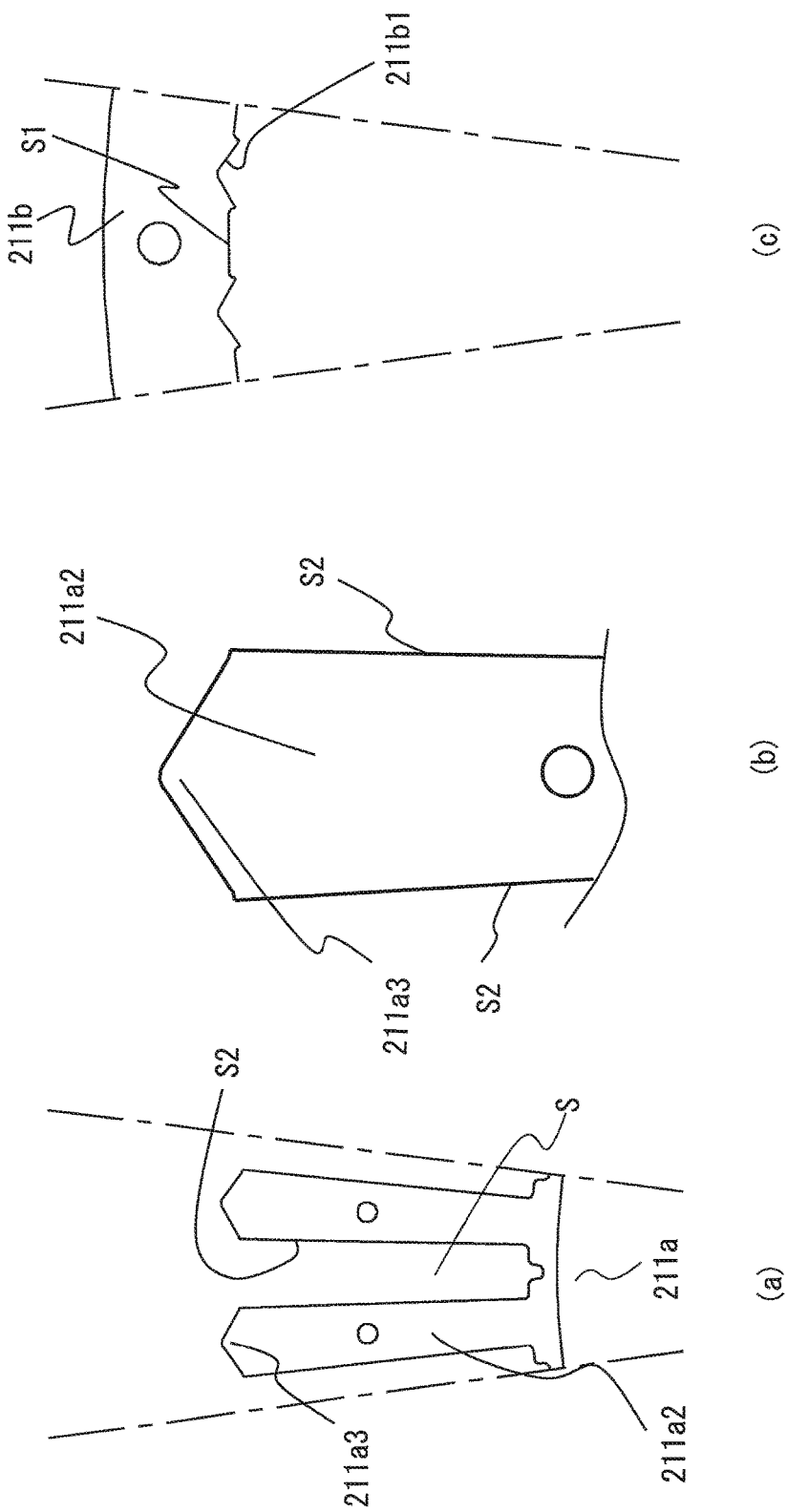

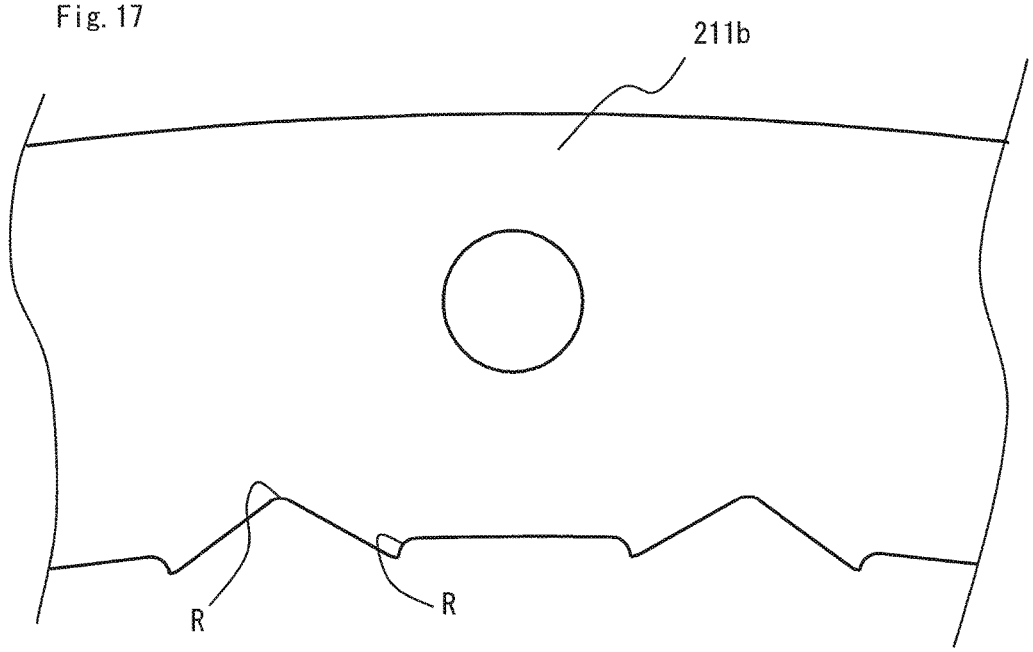

STATOR CORE, STATOR, AND ROTATING ELECTRICAL MACHINE

TECHNICAL FIELD

The present invention relates to a stator core, a stator, a method for manufacturing a stator, a rotating electrical machine, and an electric power steering device.

BACKGROUND ART

Conventionally, in a stator of an inner-rot rotating electrical machine in which an armature is placed on the outer circumferential side of a field system, there is known a stator core which is divided into an annular yoke portion and an integrally formed tooth group for such a purpose of shortening the circumferential length of a coil (see, for example, Patent Document 1). The stator core disclosed in Patent Document 1 is stamped at one time from the same material. In a stator using this stator core, a rotor is stored on the inner side of the stator core. As a method for manufacturing the stator, a coil is wound on a group of teeth whose inner-circumferential-side ends are connected in the circumferential direction with a plurality of slots provided between these teeth, and then the tooth group is fitted to the inner side of an annular yoke portion from an axial direction, thereby manufacturing the stator. In the stator manufactured as described above, the length of a route of a coil end is minimized, and thus the circumferential length of a coil can be shortened.

CITATION LIST

Patent Document

Patent Document 1: Japanese Laid-Open Patent Publication No. 07-163076

SUMMARY OF THE INVENTION

Problems to be Solved by the Invention

In the stator core of a rotating electrical machine as shown in Patent Document 1, a plurality of dovetail grooves extending in an axial direction of the core are provided at regular intervals in an inner circumferential surface of the annular yoke portion, and dovetail rails to be respectively fitted to the corresponding dovetail grooves are provided at outermost portions of the teeth of the tooth group. The annular yoke portion and the tooth group are formed by stacking core pieces stamped from one electromagnetic steel sheet by a press. Due to burr, shear droop, or the like by shear upon stamping at one time, a part corresponding to the dovetail rail is likely to expand. Since the dovetail groove and the dovetail rail are each formed by three surfaces, if the positions of the teeth of the tooth group vary in the circumferential direction or the radial direction due to bending or the like, it becomes difficult to perform fitting by the fitting process as described above. As a result, a greater press-fit force is required, leading to deterioration in cogging or torque ripple due to distortion of the core. In addition, in the case where after the tooth group is stacked, the fitting portion is processed again before the tooth group is pressed into the annular yoke portion, the number of processing steps increases, whereby the manufacturing cost increases.

The present invention has been made to solve the above problem, and an object of the present invention is to provide a stator core, a stator, a method for manufacturing a stator, a rotating electrical machine, and an electric power steering device, which have excellent assembly workability without loss of a magnetic property of the core.

Solution to the Problems

A stator core according to the present invention is a stator core composing a stator and including: an annular yoke portion; a tooth group fitted to an inner side of the annular yoke portion and formed such that both ends in a circumferential direction on an inner circumferential side of adjacent teeth are integrally connected with each other by a thin connection portion; and a slot for accommodating a stator winding. The annular yoke portion has grooves provided at regular intervals in an inner circumferential surface thereof and extending in an axial direction of the stator, the grooves each having a V shape such that a cross section thereof perpendicular to the axial direction opens toward an inner side of the stator core. Each tooth of the tooth group has, at an outer-circumferential-side end thereof, a fitting portion whose cross section perpendicular to the axial direction is formed in a wedge shape so as to allow the tooth to be fitted along the corresponding groove.

A stator according to the present invention includes: a stator core including an annular yoke portion, and a tooth group fitted to an inner side of the annular yoke portion and formed such that both ends in a circumferential direction on an inner circumferential side of adjacent teeth are integrally connected with each other by a thin connection portion; and a stator winding wound on the tooth group of the stator core. The annular yoke portion has grooves provided at regular intervals in an inner circumferential surface thereof and extending in an axial direction of the stator, the grooves each having a V shape such that a cross section thereof perpendicular to the axial direction opens toward an inner side of the stator core. Each tooth of the tooth group has, at an outer-circumferential-side end thereof, a fitting portion whose cross section perpendicular to the axial direction is formed in a wedge shape so as to allow the tooth to be fitted along the corresponding groove.

A rotating electrical machine according to the present invention includes a stator and a rotor, the stator including: a stator core including an annular yoke portion, and a tooth group fitted to an inner side of the annular yoke portion and formed such that both ends in a circumferential direction on an inner circumferential side of adjacent teeth are integrally connected with each other by a thin connection portion; and a stator winding wound on the tooth group of the stator core. The annular yoke portion has grooves provided at regular intervals in an inner circumferential surface thereof and extending in an axial direction of the stator, the grooves each having a V shape such that a cross section thereof perpendicular to the axial direction opens toward an inner side of the stator core. Each tooth of the tooth group has, at an outer-circumferential-side end thereof, a fitting portion whose cross section perpendicular to the axial direction is formed in a wedge shape so as to allow the tooth to be fitted along the corresponding groove. The stator winding is inserted across a plurality of the teeth in the stator core.

An electric power steering device according to the present invention includes a rotating electrical machine including a stator and a rotor, the stator including: a stator core including an annular yoke portion, and a tooth group fitted to an inner side of the annular yoke portion and formed such that both ends in a circumferential direction on an inner circumferential side of adjacent teeth are integrally connected with each other by a thin connection portion; and a stator winding wound on the tooth group of the stator core. The annular yoke portion has grooves provided at regular intervals in an inner circumferential surface thereof and extending in an axial direction of the stator, the grooves each having a V shape such that a cross section thereof perpendicular to the axial direction opens toward an inner side of the stator core. Each tooth of the tooth group has, at an outer-circumferential-side end thereof, a fitting portion whose cross section perpendicular to the axial direction is formed in a wedge shape so as to allow the tooth to be fitted along the corresponding groove. The rotating electrical machine has two or more slots per pole per phase. The stator winding is inserted across a plurality of the teeth in the stator core. The stator winding includes plural groups of multiphase windings arranged such that magnetic paths interlinking with the multiphase windings of the respective plural groups are partially shared thereamong. The multiphase windings are driven by each independent drive circuit for the respective plural groups. The electric power steering device further includes: a steering wheel; a torque detecting unit for detecting torque applied to the steering wheel; a voltage control unit for determining voltage to applied to the rotating electrical machine, based on a value of the torque detected by the torque detecting unit; a voltage applying unit for applying voltage to the rotating electrical machine in response to a voltage command from the voltage control unit; and a gear for transmitting, as assist torque, a drive force of the rotating electrical machine to a steering shaft of a vehicle.

A method for manufacturing a stator according to the present invention includes: a core piece stamping step of stamping, from one thin magnetic sheet, a first core piece which becomes an annular yoke portion when stacked, to compose a stator core, and a second core piece which becomes, when stacked, a tooth group formed such that both ends in a circumferential direction on an inner circumferential side of adjacent teeth are integrally connected with each other by a thin connection portion, to compose the stator core; a stacking step of respectively stacking the first core piece and the second core piece, to form the annular yoke portion and the tooth group; a winding mounting step of mounting a stator winding on the tooth group; and a press-fit step of press-fitting, in an axial direction, the annular yoke portion to an outer circumference of the tooth group on which the stator winding has been mounted. The core piece stamping step includes: a first stamping step of stamping a slot part in such a manner that a side surface, in a circumferential direction of the stator, of each slot is formed in a straight-line shape; and a second stamping step of, after the first stamping step, cutting the first core piece and the second core piece from an inner side part of the stator core relative to an outermost circumference of the slot, in such a manner that a groove having a V shape opening toward an inner side of the stator core is formed in an inner circumferential surface of the annular yoke portion. All corners of a die used in the second stamping step are processed to be rounded.

Effect of the Invention

The stator core, the stator, the method for manufacturing a stator, the rotating electrical machine, and the electric power steering device according to the present invention provide the following effects. The grooves having a V-shaped cross section perpendicular to the axial direction, which are provided at regular intervals in the inner circumferential surface of the annular yoke portion and extend along the axial direction, and the fitting portions having a wedge-shaped cross section perpendicular to the axial direction, which are provided at the outer-circumferential-side ends of the plurality of teeth whose inner-circumferential-side ends are connected by the connection portion, are fitted to each other. Therefore, the contact part where the annular yoke portion and the tooth group contact with each other can be formed by two planes inclined in the radial direction and in the circumferential direction. Therefore, in fitting, even if the fitting portion of the tooth group shifts in the circumferential direction, the fitting portion is easily aligned with the groove of the annular yoke portion while being press-fitted. Therefore, the tooth group and the annular yoke portion can be fitted to each other with a smaller press-fit force than in the case of a contact part formed by three planes, and the core can be manufactured with low cost.

Since the annular yoke portion and the tooth group are stamped at one time, a press-fit interference due to burr and shear droop caused in stamping can be provided between contact parts (which are the V-shaped groove of the annular yoke portion and the wedge-shaped fitting portion of the tooth group) of the core. Since the groove and the fitting portion each have two surfaces inclined in the radial direction and in the circumferential direction, the annular yoke portion and the tooth group can reliably contact with each other in directions in which a magnetic flux passes, whereby magnetic resistance can be reduced, output torque can be improved, and cogging and torque ripple can be reduced.

Since the contact area is small, a force for fitting the annular yoke portion to the tooth group can be suppressed, whereby assembly workability of the stator core is improved. Since the stator core is composed of the annular yoke portion and the tooth group, a coil for the stator can be inserted from an outer side. Thus, for example, even if the slot shape is a trapezoidal shape spreading outward, the coil can be inserted with a high space factor, resulting in resistance reduction of the coil and output increase of the rotating electrical machine.

In the electric power steering device using the rotating electrical machine according to the present invention, since torque pulsation and cogging torque in the rotating electrical machine are reduced, pulsation which a driver feels when steering a handle can be reduced so that the driver's steering feeling is improved, and sound in steering can be reduced. Since vibration of the rotating electrical machine is reduced, sound transmitted into a vehicle cabin can be reduced, whereby silence in the vehicle cabin can be improved. Since torque of the rotating electrical machine increases, the size and the weight of the electric power steering device can be reduced, rated torque needed in end-abutment steering or the like can be improved, and high rotation torque needed in emergency avoidance or the like can be improved.

BRIEF DESCRIPTION OF THE DRAWINGS

FIG. 11 is a view showing the shapes of the tooth group and the annular yoke portion when the yoke portion has been cut at the outermost circumferential part of the slot.

FIG. 15 is a major part enlarged view of FIG. 12(*c*).

FIG. 16 is a view showing the shapes of the tooth group (second core piece) and the annular yoke portion (first core piece) according to embodiment 2 of the present invention.

FIG. 17 is a major part enlarged view of FIG. 16(*c*).

DESCRIPTION OF EMBODIMENTS

Embodiment 1

Hereinafter, a stator core, a stator, a method for manufacturing a stator, a rotating electrical machine, and an electric power steering device according to embodiment 1 of the present invention will be described with reference to the drawings. A rotor of the rotating electrical machine according to embodiment 1 of the present invention may be any type such as a permanent magnet rotor or a salient pole rotor, but is assumed to be an inverter-drive type which allows the amplitude of drive voltage and the frequency to be changed in accordance with an operation point. In the description below, the case of a permanent magnet rotor will be described. In the description below, terms "radial direction", "axial direction", and "circumferential direction" mean a radial direction, an axial direction, and a circumferential direction of the stator unless otherwise noted.

Figure 1:
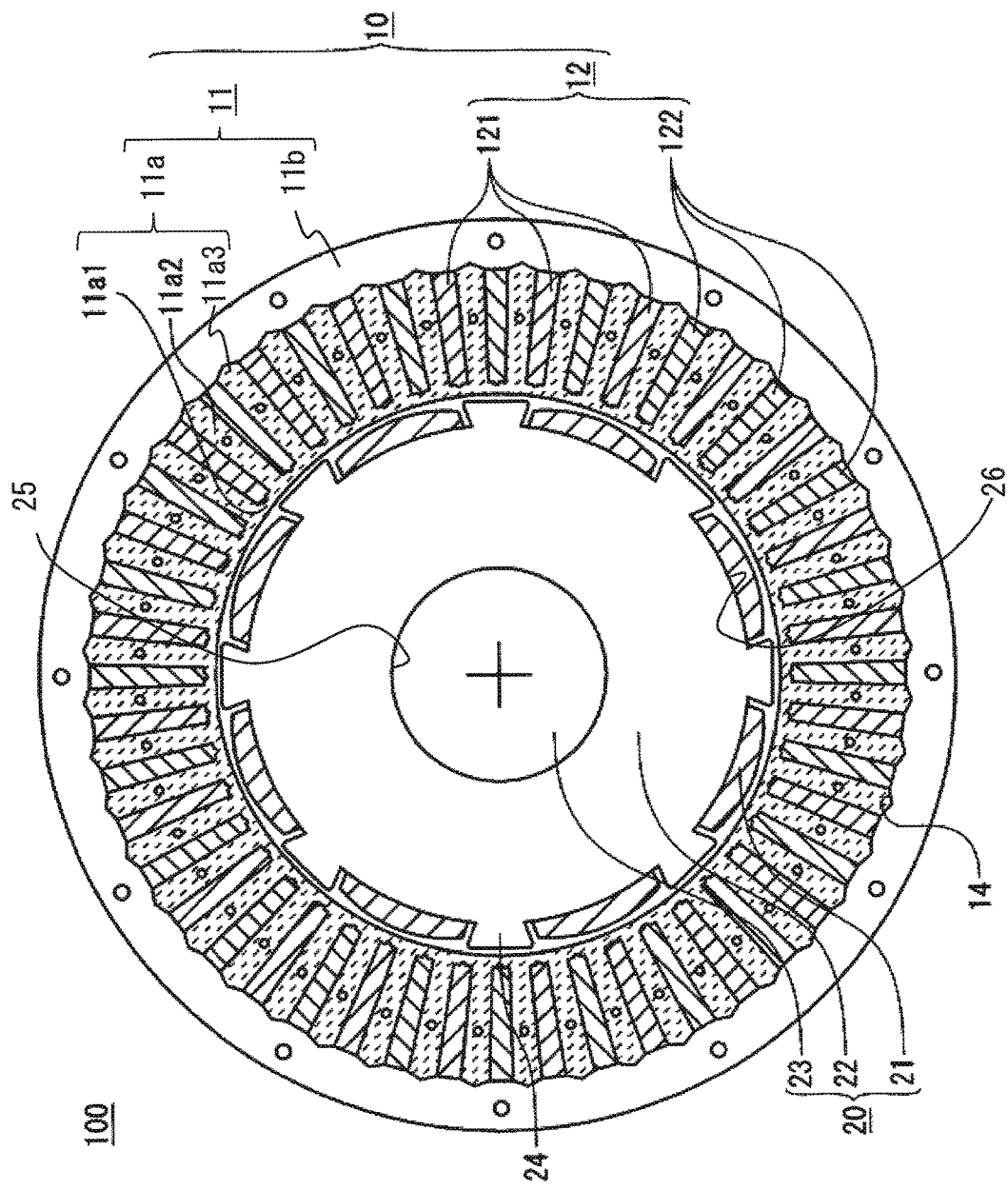
FIG. 1 is a sectional view of a rotating electrical machine according to embodiment 1 of the present invention.

FIG. 1 is a sectional view of a rotating electrical machine 100 according to the present embodiment.

The rotating electrical machine 100 is a three-phase permanent magnet rotating electrical machine having a stator winding 12 of a distributed winding type, with the number of poles being 8 and the number of slots being 48. The stator 10 includes a stator core 11 formed by stacking plural sheets of thin magnetic material, and the stator winding 12 wound on the stator core 11. The stator winding 12 includes a first group of three-phase windings 121, and a second group of three-phase windings 122. The first group of three-phase windings 121 and the second group of three-phase windings 122 are located at slots adjacent to each other. In each group of the three-phase windings 121 and 122, a U phase, a V phase, and a W phase are located with a pitch of 120 degrees by electric angle, though not shown. The stator 10 may be housed in a fixing frame (not shown) made of iron, aluminum, resin, or the like, or may be frameless.

Figure 2:
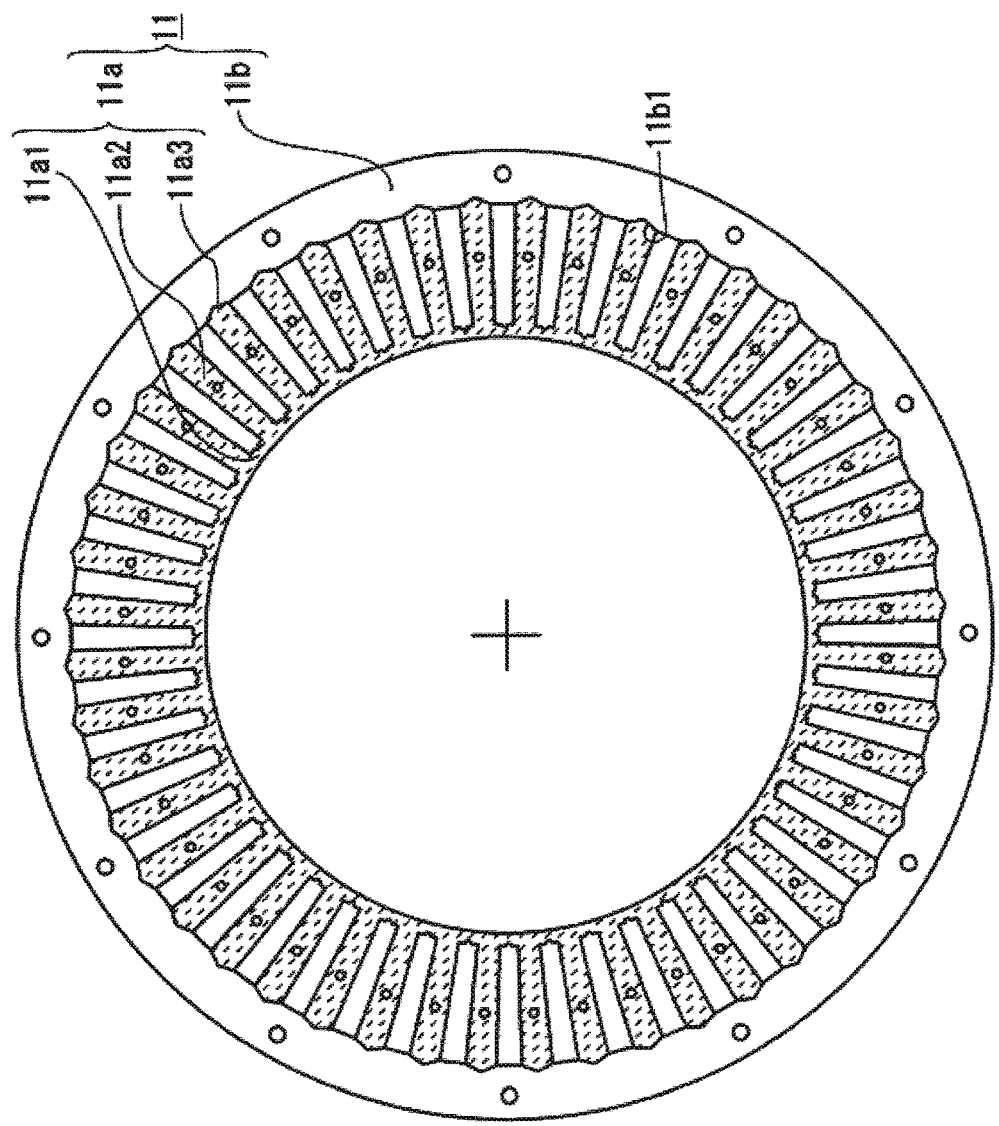
FIG. 2 is a sectional view of a stator core according to embodiment 1 of the present invention.

FIG. 2 is a sectional view of the stator core 11.

The stator core 11 includes a tooth group 11*a* and an annular yoke portion 11*b*. The tooth group 11*a* includes a thin connection portion 11*a*1 on the inner circumference thereof, and a plurality of teeth 11*a*2 extending radially outward from the thin connection portion 11*a*1. The tooth group 11*a* has a fitting portion 11*a*3 at an outer-circumferential-side end of each tooth 11*a*2. The annular yoke portion 11*b* has V-shaped grooves 11*b*1 provided at regular intervals in an inner circumferential surface thereof and extending in the axial direction of the annular yoke portion 11*b*. The fitting portion 11*a*3 of each tooth 11*a*2 and the groove 11*b*1 of the annular yoke portion 11*b* are fitted to each other. A contact part where the fitting portion 11*a*3 of each tooth 11*a*2 and the groove 11*b*1 of the annular yoke portion 11*b* are fitted to each other is indicated as a contact part 14 in FIG. 1.

In addition to a feature of the fitting portion 11*a*3 as described above, the tooth group 11*a* has the following feature.

Figure 3:
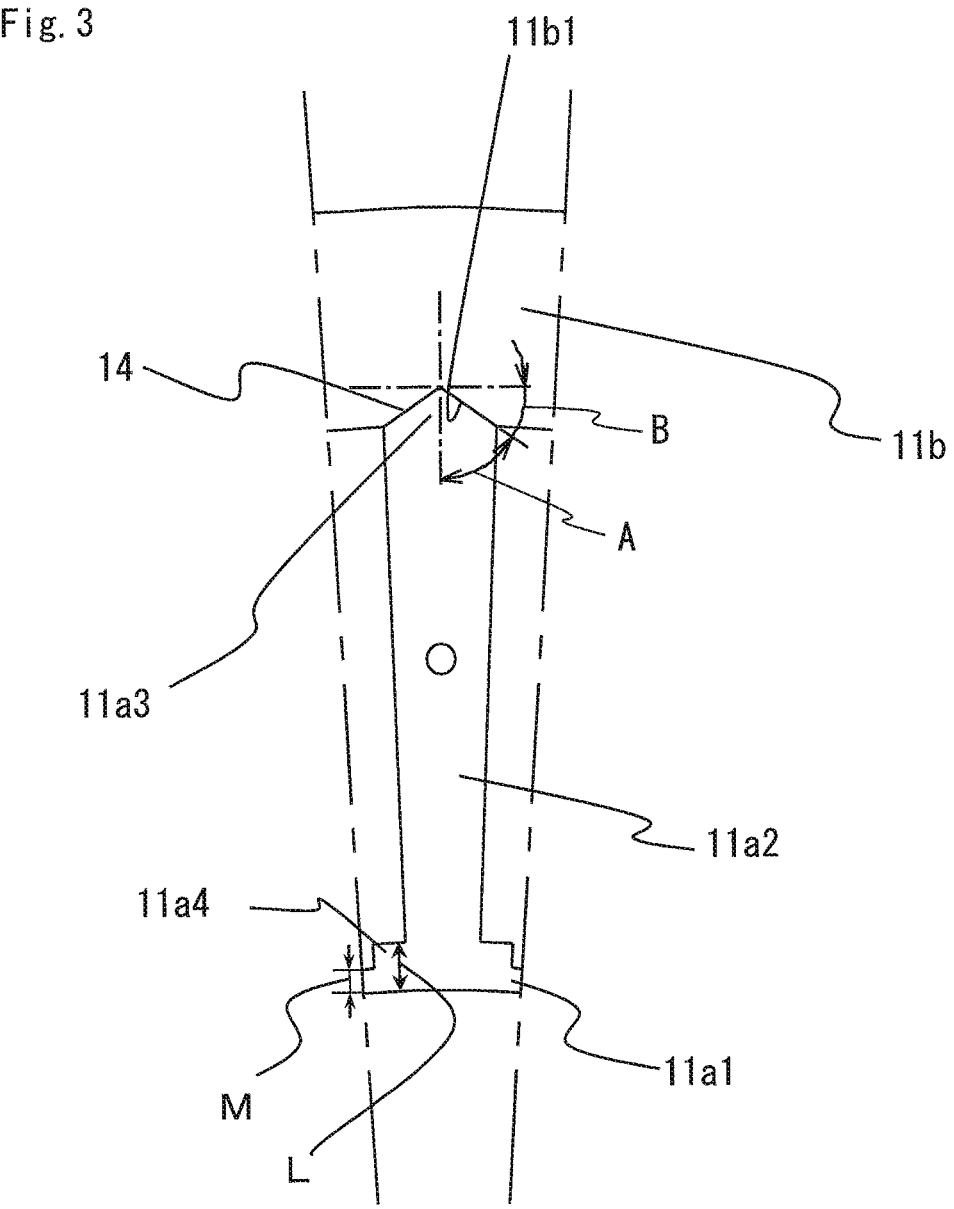
FIG. 3 is a view showing an example of a tooth group and an annular yoke portion according to embodiment 1 of the present invention.

FIG. 3 is a view showing an example of the tooth group 11*a* and the annular yoke portion 11*b*.

As shown in FIG. 3, the tooth 11*a*2 has, at its inner-circumferential-side end, the thin connection portion 11*a*1 (for example, having a dimension equal to the thickness of the thin magnetic material) having a minimum thickness that allows the strength to be kept and allows for stamping from the thin magnetic material, and a shoe 11*a*4 protruding in the circumferential direction from both sides of the tooth 11*a*2. In FIG. 3, a thickness L in the radial direction of the shoe 11*a*4 is greater than a thickness M in the radial direction of the thin connection portion 11*a*1. However, depending on design, the thickness in the radial direction of the shoe 11*a*4 may be the same as the thickness in the radial direction of the thin connection portion 11*a*1. The shoe 11*a*4 may have various shapes such as an arc shape or a shape in which the thickness in the radial direction increases from the middle between teeth 11*a*2 toward one of the teeth 11*a*2. In order to prevent magnetic saturation at the shoe 11*a*4 part, the shape of the shoe 11*a*4 may be thick in the radial direction and the thickness in the radial direction may further increase toward one of the teeth 11*a*2. Side surfaces in the circumferential direction of the tooth 11*a*2 may be parallel to each other, or may form a taper shape spreading toward the outer circumference.

Next, the contact part 14 between the tooth group 11*a* and the annular yoke portion 11*b* will be described. As shown in FIG. 3, the contact part 14 is composed of two planes where two surfaces forming the V-shaped groove 11*b*1 of the annular yoke portion 11*b* and two surfaces of the fitting portion 11*a*3 at an outer-circumferential-side end of the tooth 11*a*2 are fitted to contact with each other. Each plane of the contact part 14 is inclined with respect to both the radial direction and the circumferential direction of the stator core 11. Here, an angle of one plane of the contact part 14 with respect to the radial direction is denoted by A, and an angle thereof with respect to the circumferential direction is denoted by B. In the case where the width in the circumferential direction of the tooth 11*a*2 is the same, if A>B is satisfied, a contact area becomes smaller, and thus, the tooth group lie can be more easily press-fitted to the annular yoke portion 11*b*. In addition, if A>B is satisfied, magnetic resistance on a path of a magnetic flux flowing through the annular yoke portion 11*b* can be reduced, and thus reduction in the magnetic flux amount and in output torque can be prevented. Since an angle between the two surfaces of the groove 11b1 is 2, 2A>90 degrees is satisfied.

Figure 4:
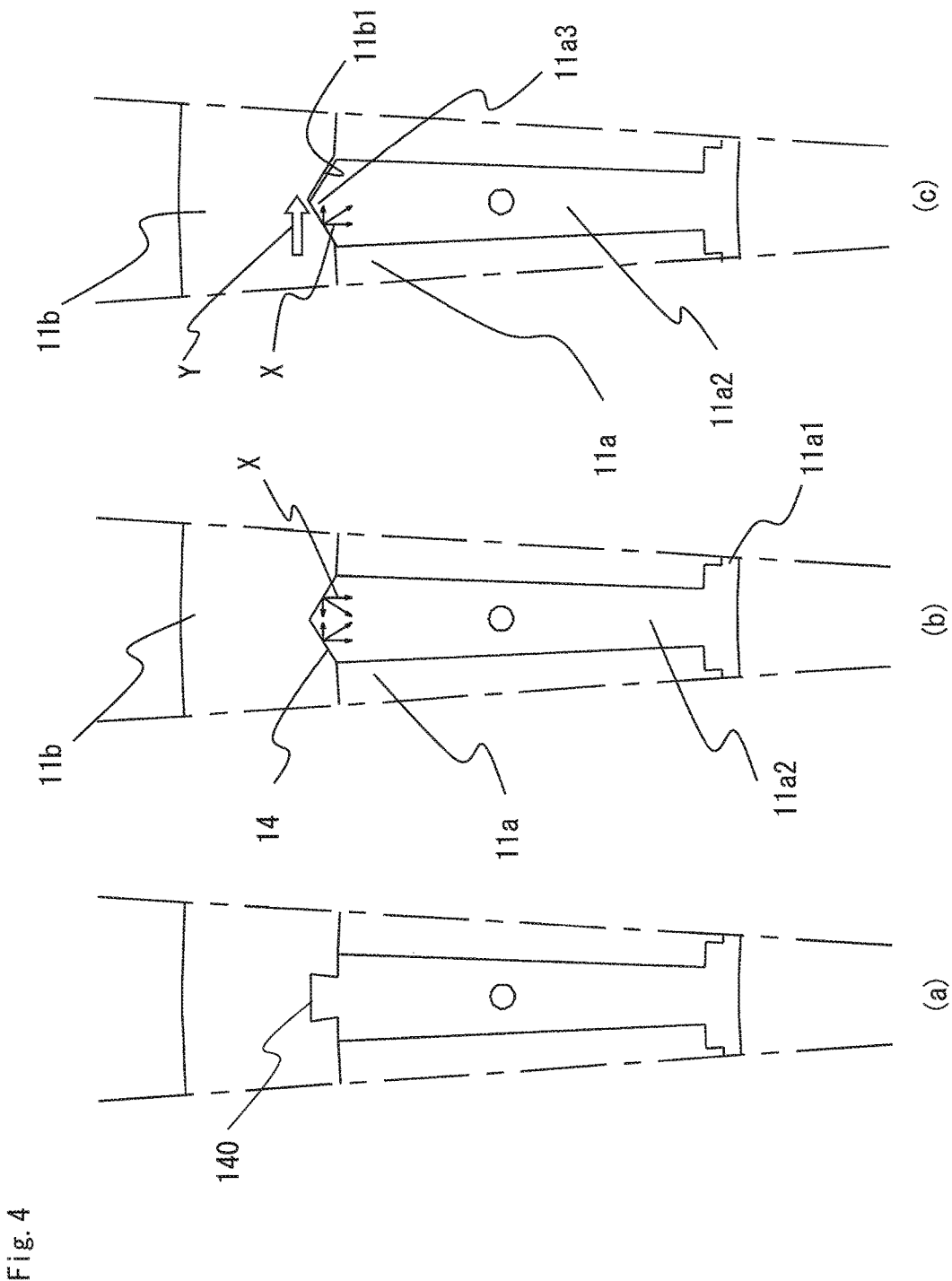
FIG. 4 is a view showing comparison between a contact part in the case of using a dovetail groove and a dovetail rail, and a V-shaped contact part of the present invention.

FIG. 4 is a view showing comparison between the case of using a dovetail groove and a dovetail rail for the contact part between the tooth group and the annular yoke portion, and the case of the V-shaped contact part 14 of the present invention.

FIG. 4(a) is a sectional view of a contact part 140 using a dovetail groove formed by three surfaces.

FIG. 4(b) is a sectional view of the contact part 14 of the present invention.

FIG. 4(c) is a view showing a state in which the tooth 11a2 of the tooth group 11a of the present invention is inclined leftward in the circumferential direction on the drawing.

The contact part 140 in FIG. 4(a) is shaped so as to have a contact area equal to that of the contact part 14 in FIG. 4(b) and FIG. 4(c). The tooth group and the annular yoke portion shown in FIG. 4(a) contact with each other by their respective three surfaces. Therefore, in fitting to the annular yoke portion, there is no relief space for a fitting portion at an outer-circumferential-side end of a tooth. That is, because of the contact by three surfaces, there is no flexibility to adapt to shifting between the contact surfaces. Therefore, a press-fit force in fitting to the annular yoke portion increases. For example, in such a case where one tooth of the tooth group bends with respect to the thin connection portion on the inner circumference, it is very difficult to perform positioning for a contact part between the tooth group and the annular yoke portion. As result, a necessary press-fit force for fitting increases, and a facility size needs to be increased. If the thickness in the radial direction of the thin connection portion on the inner circumference is increased in order to prevent increase in the press-fit force, magnetic flux leakage therefrom increases and torque of the rotating electrical machine decreases.

In contrast, at the contact part 14 of the present invention, at the time of fitting, forces indicated by an arrow X in FIG. 4(b) are applied to the contact surfaces of the tooth group 11a and the annular yoke portion 11b. At this time, even if the tooth 11a2 of the tooth group 11a is inclined leftward in the circumferential direction on the drawing as shown in FIG. 4(c), during press-fit, a force acts so that the fitting portion 11a3 of the tooth group 11a moves in a direction of an arrow Y to be aligned with the groove 11b1 of the annular yoke portion 11b. Therefore, the tooth group 11a can be easily press-fitted to the annular yoke portion 11b, and a necessary press-fit force is reduced.

The tooth group 11a and the annular yoke portion 11b described above are manufactured by being stamped by a punch from the same electromagnetic steel sheet that is magnetic material. In detail, they are stamped such that, on a plane of the electromagnetic steel sheet, the tooth group 11a is located on an inner side of the annular yoke portion 11b.

The grooves 11b1 of the annular yoke portion 11b and the fitting portions 11a3 of the tooth group 11a are formed at the same time by one stamping. In such a manufacturing method, generally, the length in the radial direction of the tooth 11a2 can become greater than a predetermined dimension, due to burr occurring in stamping, stamping of a swage portion for fixing in stacking, or the like.

Figure 5:
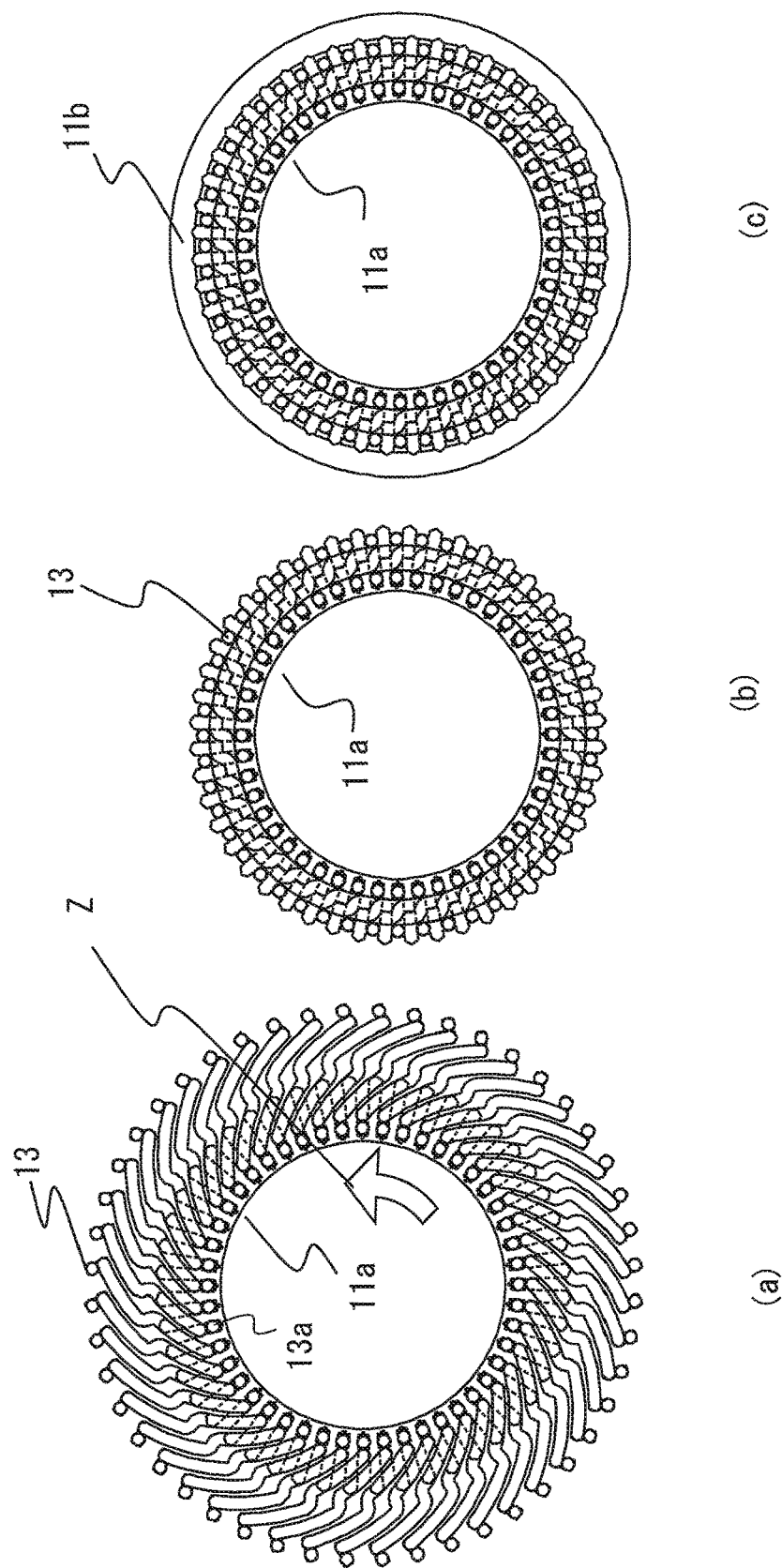
FIG. 5 is a view showing a step of, after a coil is mounted on the tooth group of the stator core, fitting the tooth group to the annular yoke portion, according to embodiment 1 of the present invention.

FIG. 5 is a view showing a step of, after coils 13 are mounted on the tooth group 11a of the stator core 11, fitting the tooth group 11a to the annular yoke portion 11b.

FIG. 5(a) is a view showing a state in which one slot insertion portion 13a of each coil 13 is being inserted to the inner circumferential side of each slot.

FIG. 5(b) is a view showing a state in which the coils 13 are inserted into the tooth group 11a.

FIG. 5(c) is a view showing a state in which the annular yoke portion 11b is fitted to the tooth group 11a.

The tooth group 11a and the annular yoke portion 11b are fitted through a step as shown in FIG. 5 (the details thereof will be described later), that is, the coils 13 are inserted to the tooth group 11a from the outer circumferential side, and then the resultant tooth group 11a is fitted to the annular yoke portion 11b from the axial direction. At this time, as described above, the tooth group 11a and the annular yoke portion 11b have extension in the radial direction due to burr or stamping of a swage portion, whereby a certain press-fit interference is generated between these members. For example, in the case of a core with about φ80 to φ90, the press-fit interference is about 20 to 40 μm. If the fitting portions 11a3 of the tooth 11a2 and the grooves 11b1 of the annular yoke portion 11b are shaped as described above, the fitting portions 11a3 can be press-fitted along the grooves 11b1 with a moderate press-fit force.

Next, the configuration of the stator winding 12 will be described. In advance, a coil 13 is formed by winding a wire with a plurality of turns in a polygonal shape, and forty-eight such coils 13 are made, the number of which is the same as the number of the slots shown in FIG. 5(a). Then, as shown in FIG. 5(a), one slot insertion portion 13a (in FIG. 5(a), including two wires) of each coil 13 is inserted into the inner circumferential side of each slot at the same time. Thereafter, while the tooth group 11a is rotated in a direction of an arrow Z in FIG. 5(a), all the other slot insertion portions 13a of the coils 13 are inserted at the same time into each slot located across a plurality of teeth 11a2 from the respective corresponding slots, thereby forming the stator winding 12. Each coil 13 is wound with two turns across a plurality of teeth 11a2. Instead of winding the stator winding 12 across a plurality of teeth 11a2 as in the present embodiment, the stator winding 12 may be wound with a plurality of turns around one tooth.

Hereinafter, the configuration of the coil 13 will be described.

Figure 6:
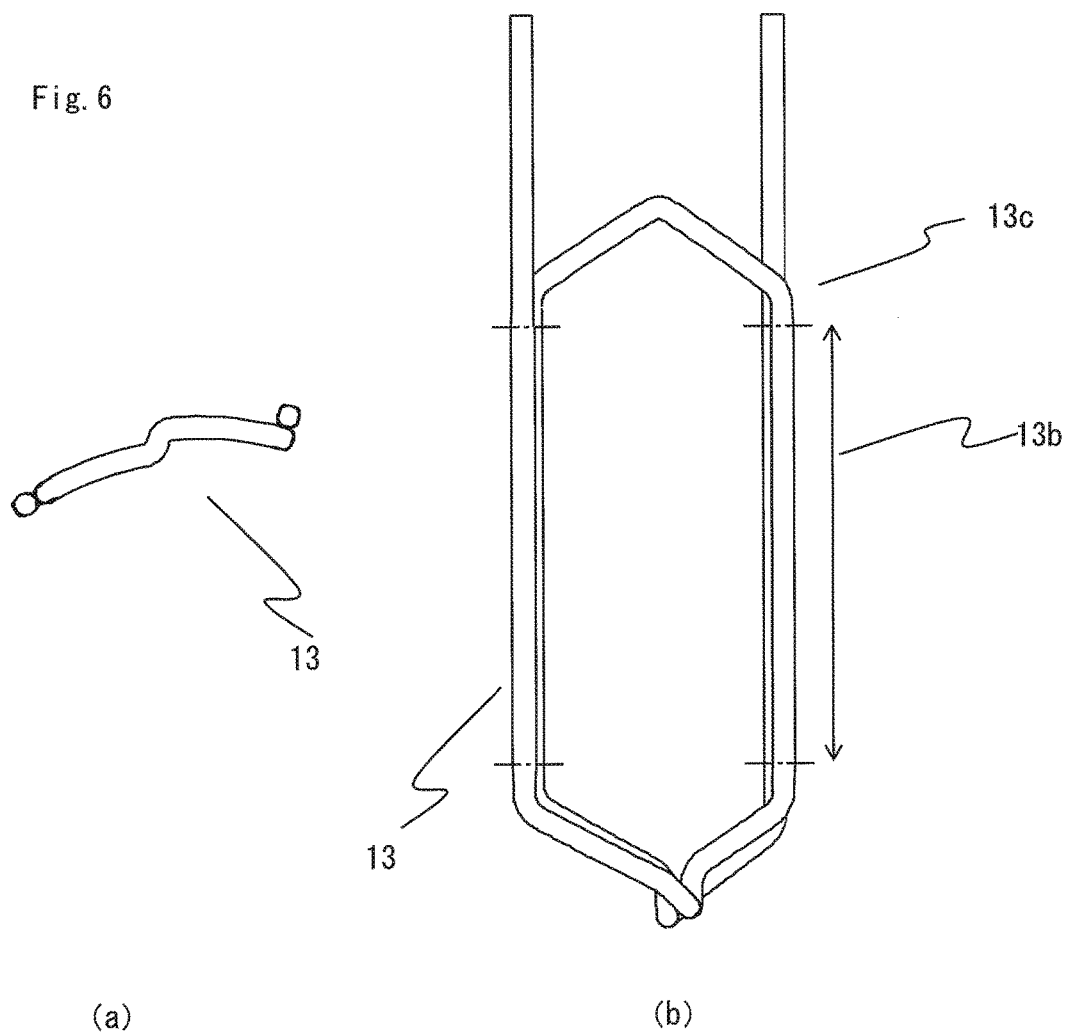
FIG. 6 is a view showing an example of a coil according to embodiment 1 of the present invention.

FIG. 6(a) is a view showing an example of the coil 13 as seen from the axial direction.

FIG. 6(b) is a side view showing another example of the coil 13.

Wave-winding may be sequentially performed across a plurality of tooth 11a2, or a coil 13 wound with a plurality of turns into a polygonal shape, e.g., a hexagonal shape as shown in FIG. 6(b) may be used. For the coil 13, it is desirable to use a conductive wire with a high conductivity, e.g., a copper wire or an aluminum wire. The sectional shape of the coil 13 may be a round shape or an angular shape. Further, a round wire only at a slot-inside conductor portion 13b may be pressed to be a substantially angular shape in FIG. 6(b), while a coil end portion 13c may remain a round wire. In this case, a space factor of the coils in the core can be increased with use of an inexpensive copper wire.

Next, the rotor 20 to be inserted inside the stator 10 will be described. As shown in FIG. 1, the rotor 20 includes a plurality of segment magnets 21, a rotor core 22 for securing a magnetic path, and a rotary shaft 23. The rotor core 22 has a hole 25 through which the rotary shaft 23 passes, a surface 26 on which each segment magnet 21 is placed, and a protrusion 24 located between magnetic poles. It is desirable to provide the protrusion 24 via a predetermined interval from the segment magnet 21. As means for positioning the segment magnet 21 in the circumferential direction, for example, protrusions in contact with the segment magnet 21 may be further provided at both ends in the axial direction of the rotor 20.

The rotor core 22 is formed by stacking plural sheets of thin magnetic material in the axial direction. Here, the thin magnetic material is an electromagnetic steel sheet, cold-reduced carbon steel sheet and strip (SPCC), or the like. In the case of a rotor core including a plurality of protrusions having different shapes, respective parts may be separately stamped and stacked, and then may be combined later. Alternatively, a stamping die may be provided with a movable mechanism, to perform stacking continuously.

Next, the segment magnet 21 placed on the outer circumferential surface of the rotor core 22 will be described. The material used for the segment magnet 21 varies depending on the magnitude of a magnetic force. The type of the magnet may be a rare earth sintered magnet, a ferrite sintered magnet, or a bonded magnet formed by kneading rare earth material or ferrite material with resin. The shape of the segment magnet 21 may be a wave shape in which both the outer circumferential surface and the inner circumferential surface have a curved-surface shape, a semicylindrical shape in which the outer circumferential surface has a curved-surface shape and the inner circumferential surface has a flat-surface shape, or a flat plate shape in which both the outer circumferential surface and the inner circumferential surface have a flat-surface shape. The shape of the surface of the rotor core 22, on which the segment magnet 21 is placed, is determined in accordance with the shape on the inner circumferential side of the magnet to be employed.

Figure 7:
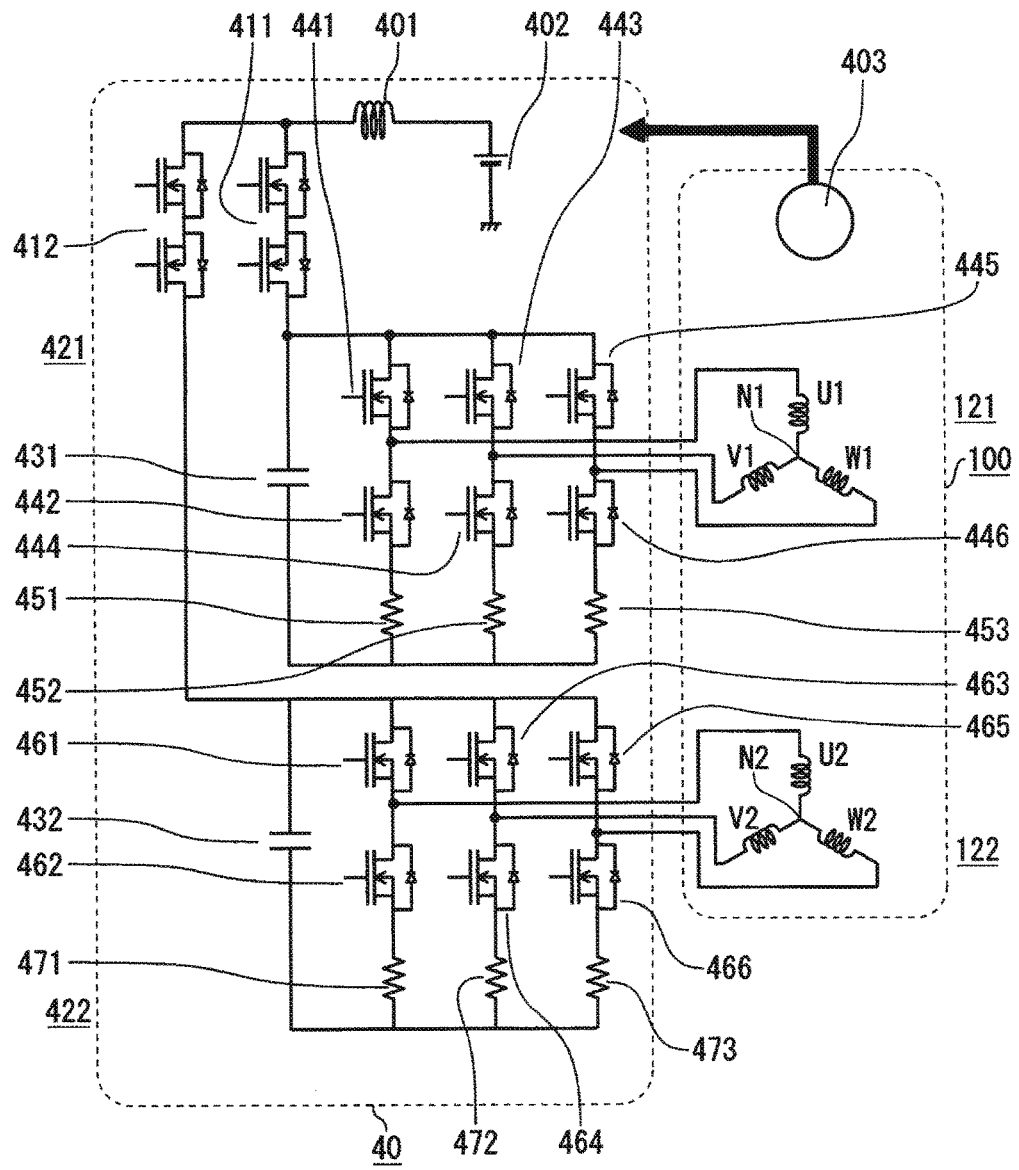
FIG. 7 is a diagram schematically showing a control unit (ECU) for driving the rotating electrical machine according to embodiment 1 of the present invention.

FIG. 7 is a diagram schematically showing a control unit (ECU) for driving the rotating electrical machine 100.

The stator winding 12 is connected to an inverter via a lead wire or the like. Generally, a first group of three-phase windings and a second group of three-phase windings are connected in series or in parallel to one inverter. However, here, the case where groups of three-phase windings are respectively connected to individual inverters to perform driving will be described. In an ECU 40, only a power circuit part of the inverter is shown in detail. The ECU 40 includes two inverter circuits, and supplies three-phase currents to the first group of three-phase windings 121 and the second group of three-phase windings 122 from inverters 421 and 422, respectively. In FIG. 7, the three-phase windings 121 and 122 are each connected in Y connection. However, delta connection may be used. The ECU 40 is supplied with DC power from a power supply 402 such as a battery, and power supply relays 411 and 412 are connected via a coil 401 for eliminating noise. Although the power supply 402 appears to be inside the ECU 40 in FIG. 7, actually, power is supplied from an external power supply such as a battery via a connector.

The two power supply relays 411 and 412 are each composed of two MOS-FETs. In the case of failure or the like, the power supply relay 411 or 412 is opened so as to prevent excessive current from flowing. In FIG. 7, the connection order is the power supply 402, the coil 401, and then the power supply relays 411 and 412. However, needless to say, the power supply relays 411 and 412 may be provided nearer the power supply 402 than the coil 401 is. A capacitor 431 and a capacitor 432 are smoothing capacitors. In FIG. 7, each capacitor is composed of a single capacitor. However, needless to say, each capacitor may be composed of a plurality of capacitors connected in parallel. The inverter 421 for the first group and the inverter 422 for the second group are each configured as a bridge using six MOS-FETs. In the inverter 421 for the first group, a MOS-FET 441 and a MOS-FET 442 are connected in series, a MOS-FET 443 and a MOS-FET 444 are connected in series, and a MOS-FET 445 and a MOS-FET 446 are connected in series. Further, the three pairs of the MOS-FETs are connected in parallel.

One shunt resistor is connected to a GND (ground) side of each of the three lower MOS-FETs 442, 444, and 446. These shunt resistors are referred to as a shunt resistor 451, a shunt resistor 452, and a shunt resistor 453, respectively. These shunt resistors are used for detecting a current value. Although the case of using three shunt resistors is shown as an example, current detection can be performed even in the case of using two shunt resistors or one shunt resistor, and therefore, needless to say, such a configuration may be employed.

Regarding supply of current to the permanent magnet rotating electrical machine 100, current is supplied from between the MOS-FET 441 and the MOS-FET 442 through a bus bar or the like to the U1 phase of the first group of three-phase windings 121 in the rotating electrical machine 100, current is supplied from between the MOS-FET 443 and the MOS-FET 444 through a bus bar or the like to the V1 phase thereof in the rotating electrical machine 100, and current is supplied from between the MOS-FET 445 and the MOS-FET 446 through a bus bar or the like to the W1 phase thereof in the rotating electrical machine 100.

The inverter 422 for the second group also has the same configuration. In the inverter 422 for the second group, a MOS-FET 461 and a MOS-FET 462 are connected in series, a MOS-FET 463 and a MOS-FET 464 are connected in series, and a MOS-FET 465 and a MOS-FET 466 are connected in series. Further, the three pairs of the MOS-FETs are connected in parallel. Further, one shunt resistor is connected to a GND (ground) side of each of the three lower MOS-FETs 462, 464, and 466. These shunt resistors are referred to as a shunt resistor 471, a shunt resistor 472, and a shunt resistor 473, respectively. These shunt resistors are used for detecting a current value. Although the case of using three shunt resistors is shown as an example, current detection can be performed even in the case of using two shunt resistors or one shunt resistor, and therefore, needless to say, such a configuration may be employed.

Regarding supply of current to the rotating electrical machine 100, current is supplied from between the MOS-FET 461 and the MOS-FET 462 through a bus bar or the like to the U2 phase of the second group of three-phase windings 122 in the rotating electrical machine 100, current is supplied from between the MOS-FET 463 and the MOS-FET 464 through a bus bar or the like to the V2 phase thereof in the rotating electrical machine 100, and current is supplied from between the MOS-FET 465 and the MOS-FET 466 through a bus bar or the like to the W2 phase thereof in the rotating electrical machine 100.

The two inverters 421 and 422 perform switching operations by a control circuit (not shown) transmitting signals to the respective MOS-FETs in accordance with a rotation angle detected by a rotation angle sensor 403 provided in the permanent magnet rotating electrical machine 100, thereby supplying desired phase currents to the first group of three-phase windings 121 and the second group of three-phase windings 122. As the rotation angle sensor 403, a resolver, a hall sensor, a GMR sensor, an MR sensor, or the like is used.

Figure 8:
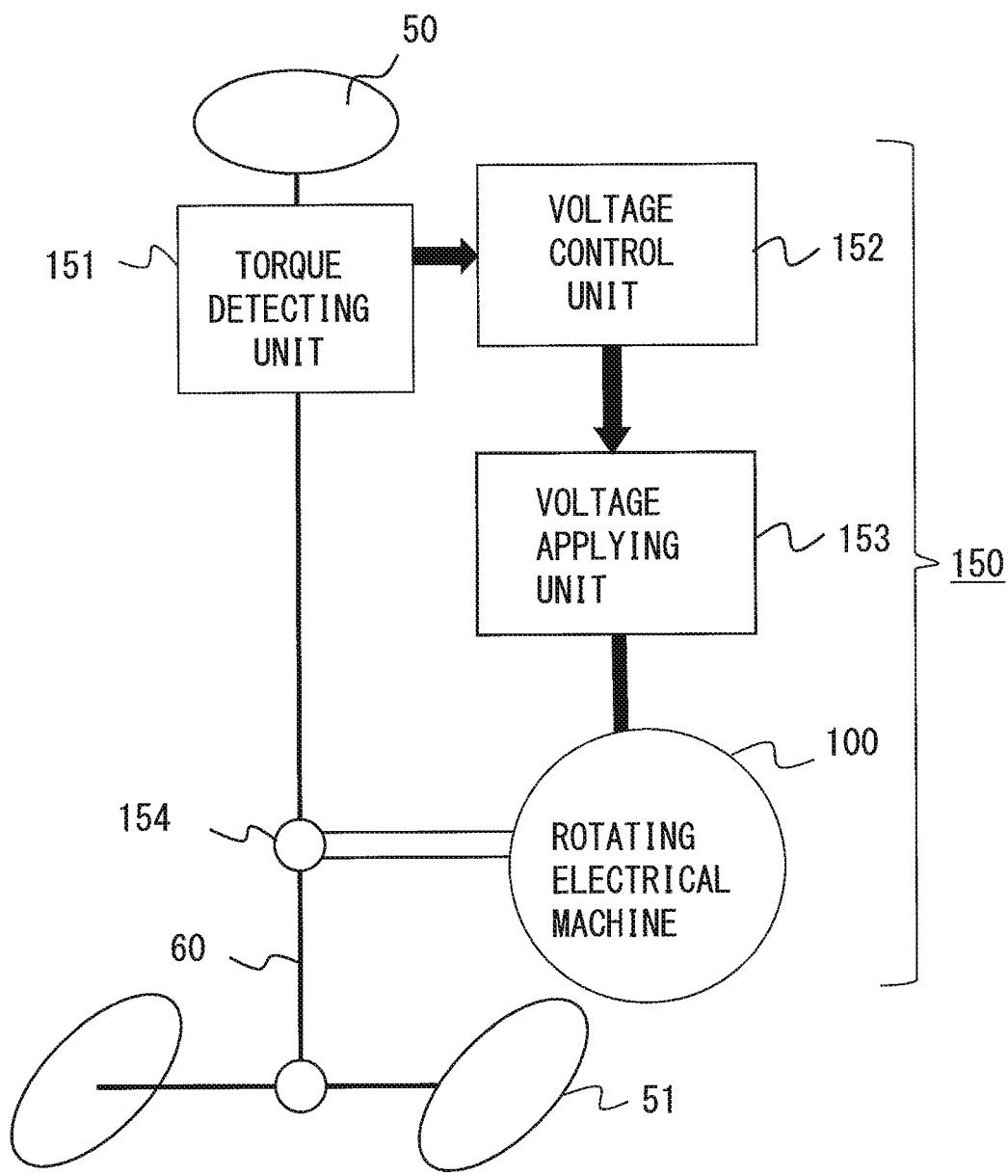
FIG. 8 is a diagram showing the configuration of an electric power steering device according to embodiment 1 of the present invention.

FIG. 8 is a diagram showing an electric power steering device 150 configured to generate assist torque by the rotating electrical machine 100 of the present embodiment.

A driver in a vehicle rotates a steering wheel 50 rightward or leftward to steer a front wheel 51. A torque detecting unit 151 detects steering torque of a steering system, and outputs the detected torque to a voltage control unit 152. The voltage control unit 152 calculates a voltage command so that the rotating electrical machine 100 generates torque for assisting the steering torque of the steering system, and outputs the voltage command to a voltage applying unit 153. The voltage applying unit 153 applies voltage based on the voltage command, to the rotating electrical machine 100. The rotating electrical machine 100 applies the torque for assisting the steering torque, to a steering shaft 60 via a gear 154.

The stator core, the stator, the method for manufacturing a stator, the rotating electrical machine, and the electric power steering device according to embodiment 1 of the present invention provide the following effects. The grooves 11b1 having a V-shaped cross section as seen from the axial direction, which are provided at regular intervals in the inner circumferential surface of the annular yoke portion 11b and extend along the axial direction, and the fitting portions 11a3 having a wedge-shaped cross section as seen from the axial direction, which are provided at the outer-circumferential-side ends of the plurality of teeth 11a2 whose inner-circumferential-side ends are connected by the thin connection portion 11a1, are fitted to each other. Therefore, the contact part 14 where the annular yoke portion 11b and the tooth group 11a contact with each other can be formed by two planes inclined in the radial direction and in the circumferential direction. Therefore, in fitting, even if the fitting portion 11a3 of the tooth group 11a shifts in the circumferential direction, the fitting portion 11a3 is easily aligned with the groove 11b1 of the annular yoke portion 11b while being press-fitted. Therefore, the tooth group 11a and the annular yoke portion 11b can be fitted to each other with a smaller press-fit force than in the case of a contact part formed by three planes, and the core can be manufactured with low cost.

Since the stator core 11 is divided into the tooth group 11a and the annular yoke portion 11b, the coils 13 can be inserted from the outer circumferential side. Therefore, even in a stator core with a slot having a trapezoidal shape or with a shoe provided on the inner circumferential side of the core, the coils can be placed with a high space factor, and owing to reduction in magnetic resistance, increase in output torque of the rotating electrical machine and reduction in heat generation can be expected.

The above configuration of the stator 10 can exert its effect in any type (concentrated winding or distributed winding) of the stator. Particularly, in the permanent magnet rotating electrical machine 100 having the stator 10 of a distributed winding type, the segment magnet 21, and the rotor core 22 having a protrusion, reluctance torque can be easily obtained, and therefore torque increase and output increase or size reduction and cost reduction can be achieved using both magnet torque and reluctance torque.

Next, effects due to the configurations of the permanent magnet rotating electrical machine 100 and the ECU 40 will be described. Three-phase currents flow in the first group of three-phase windings 121 and the second group of three-phase windings 122 by the first group of inverter 421 and the second group of inverter 422. If a current phase difference between the groups is set at 20 degrees to 40 degrees by electric angle, or desirably, 30 degrees by electric angle, a sixth-order component (where a component with a cycle of 360 degrees by electric angle is defined as first order) of torque ripple is greatly reduced. This is because, even if magnetomotive force harmonics generated on the rotor side include fifth-order and seventh-order components (where a component with a cycle of 360 degrees by electric angle is defined as first order), by changing the phase of current in the three-phase windings of each group is changed, fifth-order and seventh-order components in a magnetomotive force waveform on the armature side can be eliminated or made very small. This phase difference may be changed in accordance with the driving condition of the permanent magnet rotating electrical machine 100, or may be fixed at 30 degrees by electric angle, for example. In the case where the phase difference is set at 30 degrees by electric angle, a winding factor is equivalently improved, and torque is also improved. Therefore, great torque can be obtained with a small magnet use amount, and thus an effect of contributing to cost reduction of the rotating electrical machine 100 is provided.

Since the rotor core 22 has the protrusion 24, reluctance torque owing to saliency of the rotor 20 can be obtained as well as magnet torque by the segment magnet 21. If a difference between inductance on a d axis passing through the center of a magnetic pole and inductance on a q axis passing between poles becomes greater, greater torque can be obtained. Since the protrusion 24 made of magnetic material projects as shown in FIG. 1, q-axis inductance can be increased.

In the electric power steering device 150 including the rotating electrical machine 100 in which inverters are respectively connected to the first group of three-phase windings 121 and the second group of three-phase windings 122 according to the present embodiment, since torque pulsation and cogging torque in the rotating electrical machine 100 are reduced, pulsation that a driver feels when steering a handle can be reduced so that the driver's steering feeling is improved, and sound in steering can be reduced. Since vibration of the rotating electrical machine 100 is reduced, sound transmitted into a vehicle cabin can be reduced, whereby silence in the vehicle cabin can be improved. Since torque of the rotating electrical machine 100 increases, the size and the weight of the electric power steering device 150 can be reduced, rated torque needed in full lock steering or the like can be improved, and high rotation torque needed in emergency avoidance or the like can be improved.

Embodiment 2

A stator core, a stator, a method for manufacturing a stator, a rotating electrical machine, and an electric power steering device according to embodiment 2 of the present invention will be described focusing on difference from embodiment 1.

Figure 9:
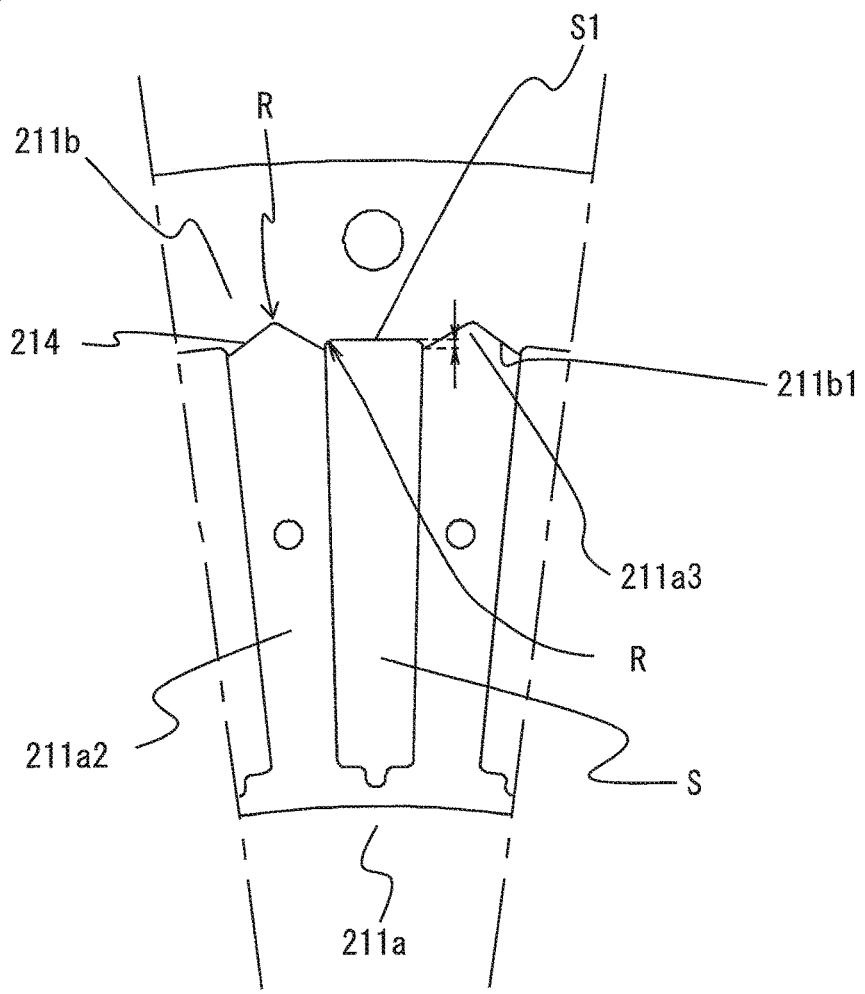
FIG. 9 is a major part enlarged view of contact part between a tooth group and an annular yoke portion, and a slot, of a stator core according to embodiment 2 of the present invention.

FIG. 9 is a major part enlarged view of a contact part 214 between a tooth group 211a and an annular yoke portion 211b, and a slot S, of a stator core according to embodiment 2 of the present invention.

As shown in FIG. 9, an outermost circumferential part of a groove 211b1 provided along the axial direction in an inner circumferential surface of the annular yoke portion 211b is processed by a rounding process (which chamfers a corner to be rounded). In FIG. 9, R indicates a part processed to be rounded. The contact part 214 where the groove 211b1 and a fitting portion 211a3 of each tooth 211a2 of the tooth group 211a contact with each other is formed by two planes inclined with respect to both the circumferential direction and the radial direction of the stator core, as in embodiment 1. Further, in embodiment 2, an outer end in the circumferential direction of each contact surface at the contact part 214 is located to the core inner side relative to an outermost circumferential part S1 of a space forming the slot S.

If the annular yoke portion 211b and the tooth group 211a have such shapes, it becomes possible to perform a rounding process on three corners of the contact part 214 where the annular yoke portion 211b and the tooth group 211a contact with each other. Owing to the rounding process, deterioration in a die when a core piece is stamped is prevented, and the facility cost can be suppressed to be low. The reason therefor will be described with reference to FIG. 10 to FIG. 17.

Figure 10:
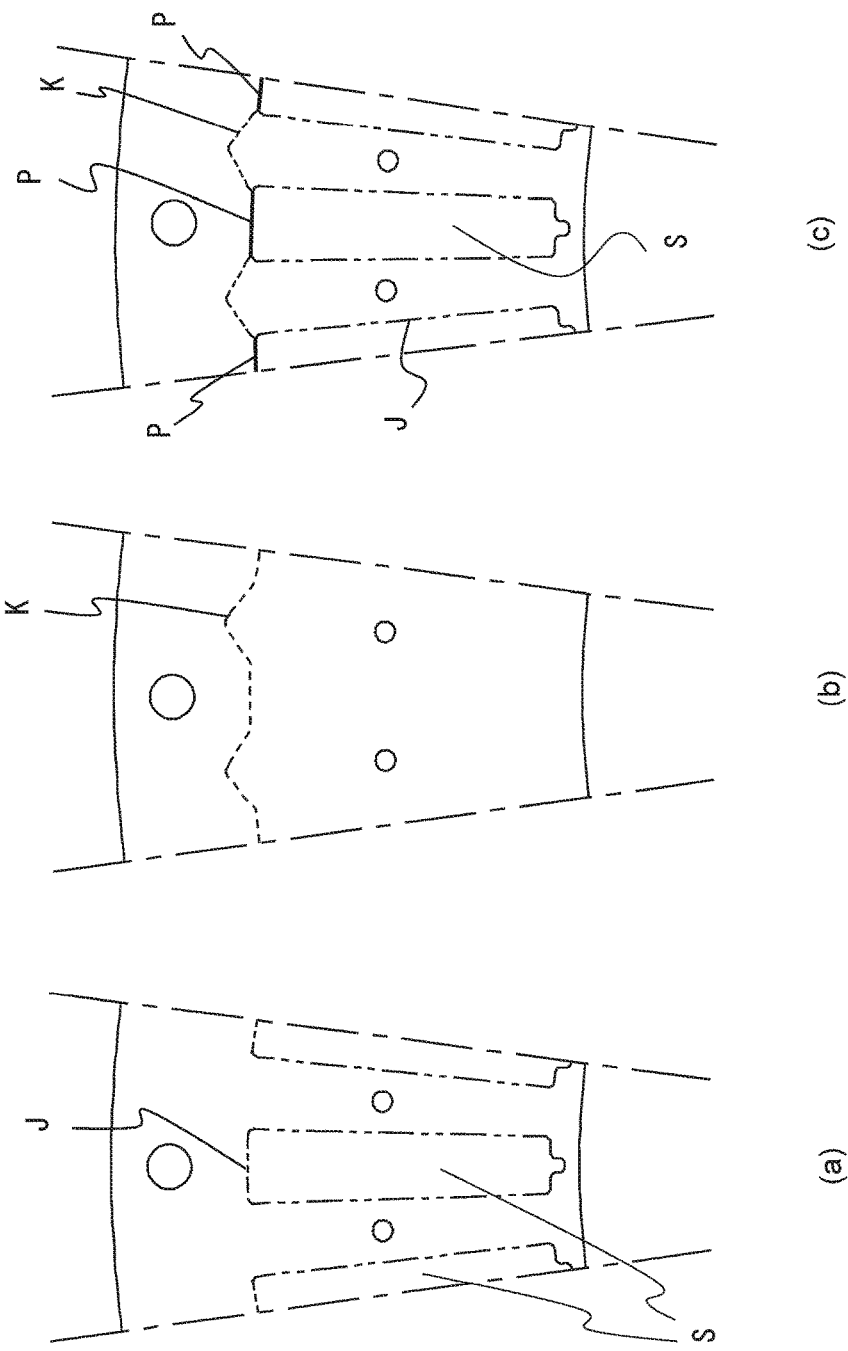
FIG. 10 is a view showing a core piece stamping step in the case where the yoke portion is to be cut at the outermost circumferential part of the slot.
Figure 12:
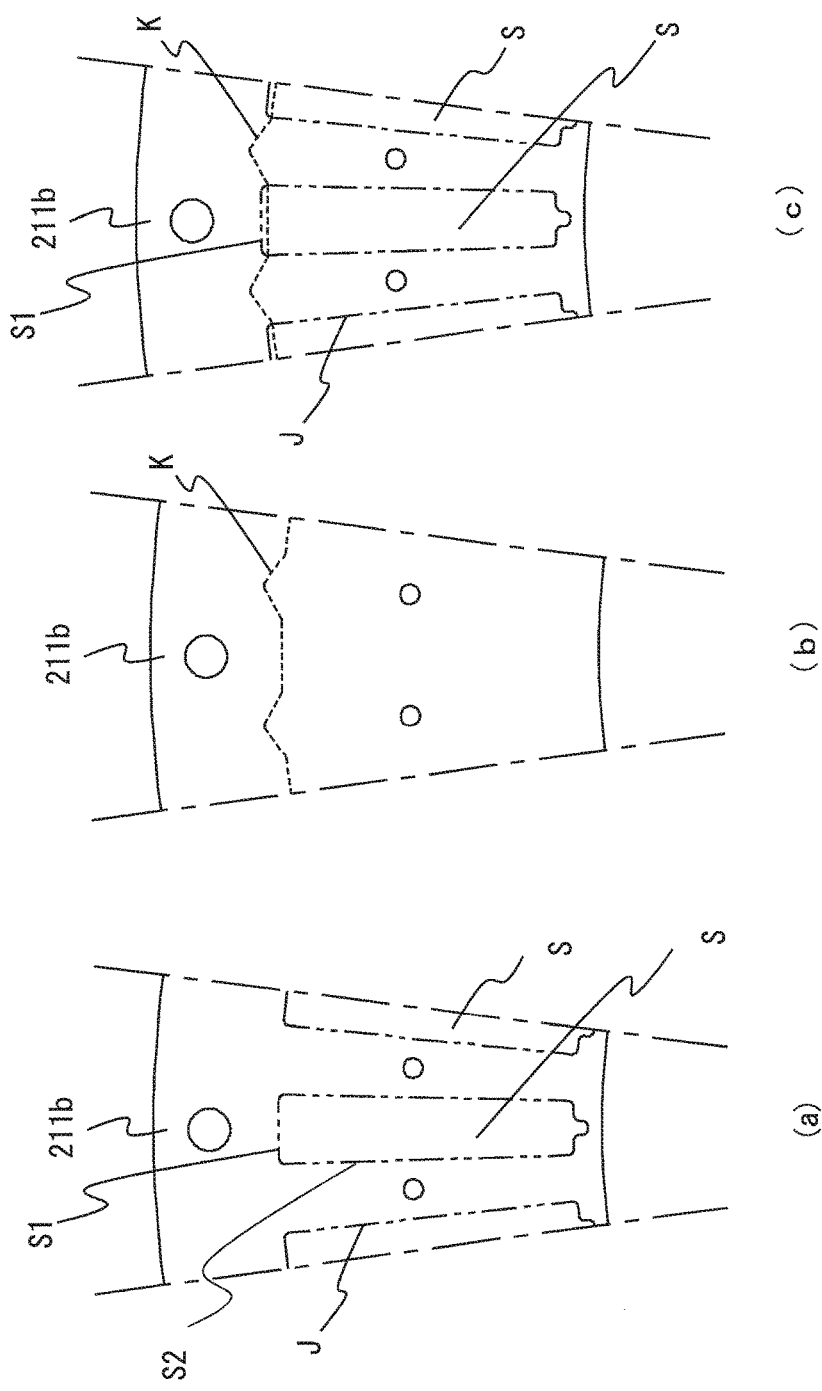
FIG. 12 is a view showing a core piece stamping step according to embodiment 2 of the present invention.

FIG. 10 and FIG. 11 are views showing a core piece stamping step and the shape of stamped members, in the case of not implementing embodiment 2 (i.e., the case where the ends of the contact part 214 and the outermost circumferential part of the slot are located at the same position).

FIG. 10(a) is a view showing a part to be stamped in a first stamping step.

FIG. 10(b) is a view showing a part to be stamped in a second stamping step.

FIG. 10(c) is a view showing the part to be stamped in the first stamping step and the part to be stamped in the second stamping step in an overlapped manner.

FIG. 11(a) is a view showing a partial shape of the stamped tooth group.

FIG. 11(b) is a major part enlarged view of the tooth.

FIG. 11(c) is a view showing the shape of the stamped annular yoke portion.

In stamping of a core piece for a stacked core having a plurality of slots S, generally, a slot part is often stamped prior to a step of stamping the other parts. Then, after the slots S (the first stamping step of stamping a two-dotted dashed line part J in FIG. 10) and the other parts are stamped, finally, in the second stamping step, a part (a broken line part K in FIG. 10) corresponding to the contact part 214 between a part corresponding to the tooth group and a part corresponding to the annular yoke portion 211b is stamped so as to be divided.

In the case of stamping a metal piece, for such a purpose of suppressing early deterioration in a die, it is desirable to perform a rounding process on a corner of a stamping shape. Looking at FIG. 10 in light of the above, as shown in FIG. 10(a), the two-dotted dashed line part J corresponding to a slot part is stamped in the first stamping step, and then as shown in FIG. 10(b), the broken line part K is stamped in the second stamping step, to divide the contact part. Then, the tooth group and the annular yoke portion shown in FIG. 11 are obtained. Here, in FIG. 10(c), a part at which the part to be stamped in the first stamping step and the part to be stamped in the second stamping step overlap each other is indicated by a solid line P. As shown by the solid line P, the outermost circumferential part of the slot S and the ends of the contact part are located at the same position. At ends in the circumferential direction of the fitting portion (corresponding to the contact part) of each tooth of the stamped tooth group, rounded-shape portions formed when the slot part is stamped are left. As shown in FIG. 11(a) and FIG. 11(b), ends D in the circumferential direction of these portions protrude into the slot. If such a protruding portion is left on the tooth, this portion hinders insertion of a coil with a high space factor.

Considering the above, a stamping step of the present embodiment has the following feature.

FIG. 12 to FIG. 15 are views showing a core piece stamping step in the case of implementing embodiment 2.

FIG. 12(a) is a view showing a part to be stamped in a first stamping step.

FIG. 12(b) is a view showing a part to be stamped in a second stamping step.

FIG. 12(c) is a view showing the part to be stamped in the first stamping step and the part to be stamped in the second stamping step in an overlapped manner.

Figure 13:
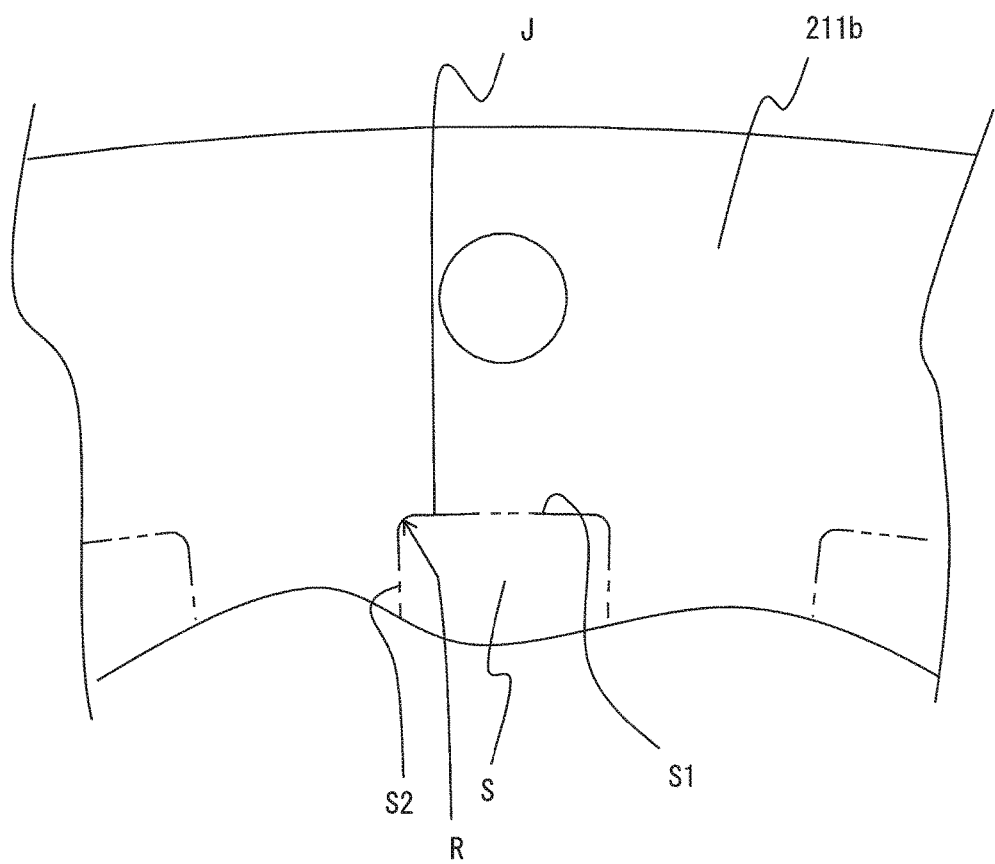
FIG. 13 is a major part enlarged view of FIG. 12(*a*).

FIG. 13 is a major part enlarged view of FIG. 12(a).

Figure 14:
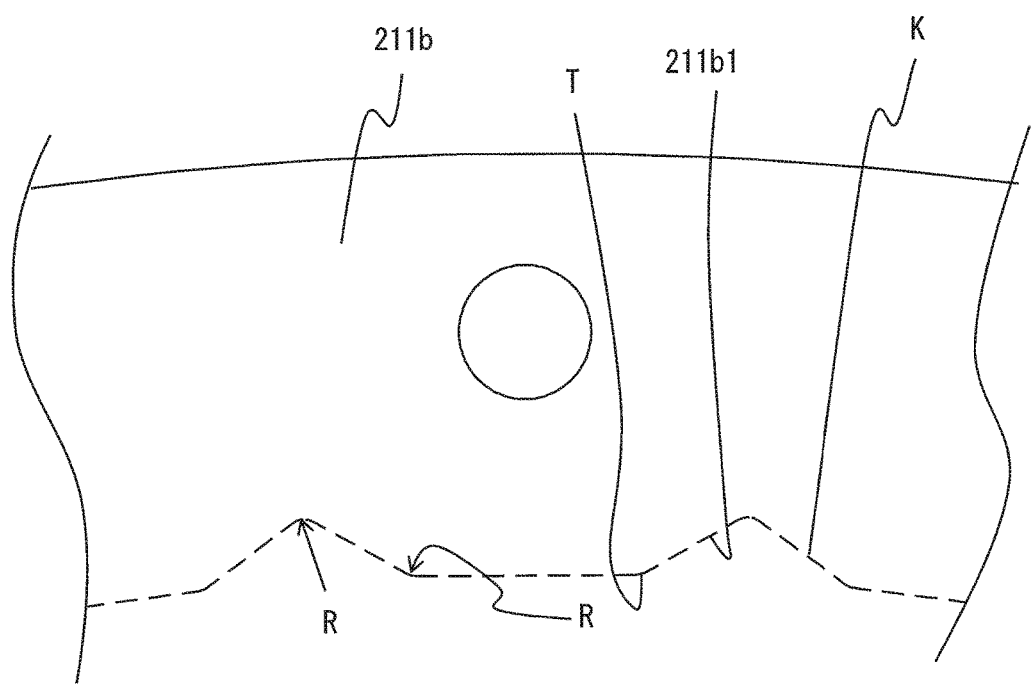
FIG. 14 is a major part enlarged view of FIG. 12(*b*).

FIG. 14 is a major part enlarged view of FIG. 12(b).

FIG. 15 is a major part enlarged view of FIG. 12(c).

The description of a step for stamping an outer circumferential part of the annular yoke portion 211b is omitted. First, as shown in FIG. 12(a) and FIG. 13, in the first stamping step, a slot part indicated by a two-dotted dashed line part J is stamped so that an edge S2 of the slot S becomes a straight line. A die used at this time is a die in which parts for stamping corners in the circumferential direction of the outermost circumferential part and the innermost circumferential part of the slot S are processed to be rounded. Next, the second stamping step of stamping a broken line part K in FIG. 12(b) and FIG. 14 is performed. A die used at this time is a die with no angular part, in which a part for stamping the outermost circumferential part of the groove 211b1 and parts for stamping ends T in the circumferential direction of a part (G in FIG. 15) corresponding to the contact part 214 are processed to be rounded. As shown in FIG. 12(c) and FIG. 15, the second stamping step is performed in a state in which the position of the outermost circumferential part S1 of the slot S is shifted to the outer side in the radial direction of the core relative to the ends T in the circumferential direction of the part (G in FIG. 15) corresponding to the contact part 214, and thus a first core piece corresponding to the annular yoke portion 211b and a second core piece corresponding to the tooth group 211a are separated.

FIG. 16 and FIG. 17 show the shapes of the stamped tooth group 211a and the stamped annular yoke portion 211b.

FIG. 16(a) is a view showing a partial shape of the stamped tooth group 211a.

FIG. 16(b) is a major part enlarged view of the tooth 211a2.

FIG. 16(c) is a view showing the shape of the stamped annular yoke portion 211b.

FIG. 17 is a major part enlarged view of FIG. 16(c).

As shown in FIG. 16(a) and FIG. 16(b), an end in the circumferential direction of the fitting portion 211a3 of each stamped tooth 211a2 does not protrude into the slot S. Therefore, a rounded-shape portion formed at a corner in the circumferential direction of the slot is prevented from being left protruding in the circumferential direction from the tooth 211a2 in the second stamping step. In addition, the edge S2 in the circumferential direction of the slot S can be formed in a straight-line shape, whereby insertion of the coil 13 is facilitated.

Configurations other than the stator core are the same as in embodiment 1. In the method for manufacturing a stator core of a rotating electrical machine according to embodiment 2 of the present invention, deterioration in a die is prevented, and a side surface in the circumferential direction of a slot is formed in a straight-line shape, whereby insertion of a coil with a high space factor can be facilitated. Therefore, a rotating electrical machine with high output and with small heat generation can be obtained with low cost.

It is noted that, within the scope of the present invention, the above embodiments may be freely combined with each other, or each of the above embodiments may be modified or abbreviated as appropriate.

The invention claimed is:

1. A stator core comprising:
    an annular yoke portion; and
    a tooth group fitted to an inner side of the annular yoke portion and formed such that both ends in a circumferential direction on an inner circumferential side of adjacent teeth are integrally connected with each other by a thin connection portion,
    wherein
    a slot for accommodating a stator winding is formed among each two adjacent teeth and the annular yoke portion,
    the annular yoke portion has grooves provided at regular intervals in an inner circumferential surface thereof and extending in an axial direction of the stator core, the grooves each having a V shape such that a cross section thereof perpendicular to the axial direction opens toward an inner side of the stator core,
    each tooth of the tooth group has, at an outer-circumferential-side end thereof, a fitting portion whose cross section perpendicular to the axial direction is formed in a wedge shape so as to allow the tooth to be fitted along the corresponding groove,
    a rounded portion is formed at an outermost-circumferential-side end of a side surface in a circumferential direction of each slot, and
    a boundary, in each slot, between the annular yoke portion and each tooth is positioned at an innermost-circumferential-side part of the rounded portion.

2. The stator core according to claim 1, wherein at least one of a bottom of each groove or an edge of each groove is processed to be rounded.

3. A stator comprising:
    a stator core; and
    a stator winding wound on a tooth group of the stator core, wherein
    the stator core includes an annular yoke portion, and the tooth group fitted to an inner side of the annular yoke portion and formed such that both ends in a circumferential direction on an inner circumferential side of adjacent teeth are integrally connected with each other by a thin connection portion,
    a slot for accommodating a stator winding is formed among each two adjacent teeth and the annular yoke portion,
    the annular yoke portion has grooves provided at regular intervals in an inner circumferential surface thereof and extending in an axial direction of the stator core, the grooves each having a V shape such that a cross section thereof perpendicular to the axial direction opens toward an inner side of the stator core,
    each tooth of the tooth group has, at an outer-circumferential-side end thereof, a fitting portion whose cross section perpendicular to the axial direction is formed in a wedge shape so as to allow the tooth to be fitted along the corresponding groove,
    a rounded portion is formed at an outermost-circumferential-side end of a side surface in a circumferential direction of each slot, and
    a boundary, in each slot, between the annular yoke portion and each tooth is positioned at an innermost-circumferential-side part of the rounded portion.

4. The stator according to claim 3, wherein at least one of a bottom of each groove or an edge of each groove is processed to be rounded.

5. A rotating electrical machine comprising:
    a stator; and
    a rotor rotating while being opposed to an inner circumferential surface to the stator, wherein
    a stator core composing the stator
    includes an annular yoke portion, and a tooth group fitted to an inner side of the annular yoke portion and formed such that both ends in a circumferential direction on an inner circumferential side of adjacent teeth are integrally connected with each other by a thin connection portion,
    a slot for accomodating a stator winding is formed among each two adjacent teeth and the annular yoke portion,
    the annular yoke portion has grooves provided at regular intervals in an inner circumferential surface thereof and extending in an axial direction of the stator core, the grooves each having a V shape such that a cross section thereof perpendicular to the axial direction opens toward an inner side of the stator core,
    each tooth of the tooth group has, at an outer-circumferential-side end thereof, a fitting portion whose cross section perpendicular to the axial direction is formed in a wedge shape so as to allow the tooth to be fitted along the corresponding groove,
    a rounded portion is formed at an outermost-circumferential-side end of a side surface in a circumferential direction of each slot,
    a boundary, in each slot, between the annular yoke portion and each tooth is positioned at an innermost-circumferential-side part of the rounded portion, and the stator winding is inserted across a plurality of the teeth in the stator core.

6. The rotating electrical machines according to claim 4, wherein
    the rotating electrical machine has two or more slots per pole per phase,
    the stator winding includes plural groups of multiphase windings arranged such that magnetic paths interlinking with the multiphase windings of the respective plural groups are partially shared theramong, and
    the multiphase windings are driven by each independent drive circuit the respective plural groups.

* * * * *